United States Patent Office.

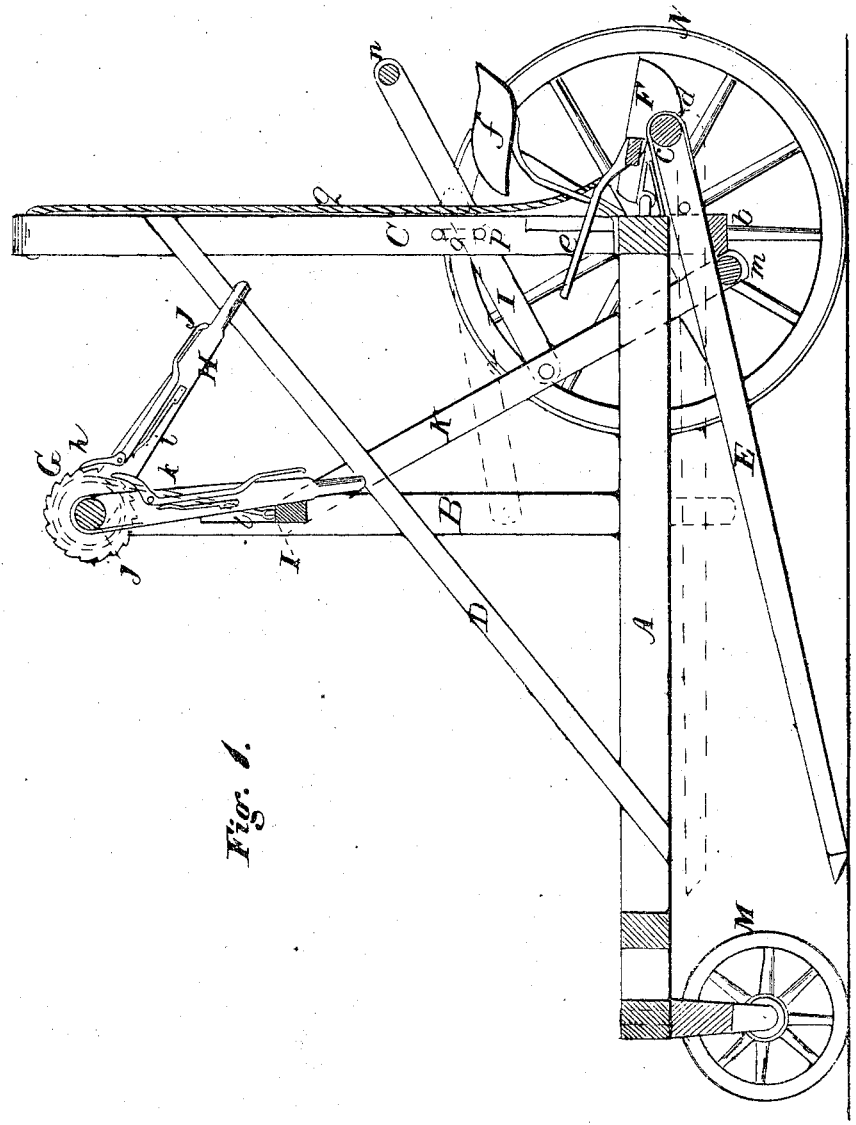

A. J. McKEE AND S. D. McKEE, OF BEAVER DAM, OHIO.

Letters Patent No. 91,147, dated June 8, 1869.

---

IMPROVEMENT IN HAY-LOADERS.

---

The Schedule referred to in these Letters Patent and making part of the same.

---

*To all whom it may concern:*

Be it known that we, A. J. McKEE and S. D. McKEE, of Beaver Dam, in the county of Allen, and State of Ohio, have invented certain new and useful Improvements in Hay-Gatherers; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention relates to hay-gatherers, and consists in the novel construction and arrangement of certain mechanical devices, in connection with a suitable frame, and mounting the whole on wheels, so that it may be conveniently drawn about, and operated by the driver for gathering hay.

In the drawing, the figure represents a longitudinal vertical section of our machine, or hay-gatherer.

In constructing it, we make a strong rectangular or other suitable-shaped frame, A, having two uprights, B and C, on each side, held firmly in place by a brace, D, as shown in the drawing.

Under the cross-piece a, in the rear end of the frame A, we place another cross-piece, b, provided with a series of openings, of the proper size and form for receiving, supporting, and allowing the easy longitudinal motion of a series of teeth, E, which we insert therein.

The rear ends of the teeth E we connect to a cross-piece, c, by metal straps, d, or by any equivalent device, and hold them in position by a hook, F, hinged or connected to the rear side of the cross-piece a, and also provided with a lever, e, arranged as shown, so as to be conveniently operated by the foot of the driver when in his seat, f, mounted on the cross-piece a, as clearly shown in the drawing.

In suitable bearings in the upper ends of the uprights B, we mount a windlass, g, having rigidly attached thereto two ratchet-wheels, and loosely connected therewith, two levers or arms, H, having pawls, h, pivoted to their sides, and arranged so as to catch into the ratchet-wheels G, and be held there by a spring, i, or be released by the handle j, as shown.

To this windlass, g, we attach one end of cords, k, the opposite ends of which we connect to a cross-piece, I, arranged to move vertically in slots, l, in the uprights B, and to the opposite ends of the cross-piece I, pivot the ends of a bail, K, arranged so that the cross-piece m, connecting its opposite ends, shall swing under the teeth E; and to the sides of the bail, pivot arms, L, of sufficient length to extend alongside of and beyond the rear uprights C, through a metallic guide-loop, o, and their outer ends connect by a cross-bar, n, and in their sides cut notches, p, for catching into the loop o, so as to hold the bail K back, when desired.

The machine, thus constructed, we mount on wheels, M and N. The forward wheels may be small, and their axle so constructed and arranged as to allow the wheels to turn under the frame, when desired. The hind wheels, M, may be of any size desired, and have an independent axle, or the cross-piece a may be so constructed as to be used as an axle for them.

In operating our machine, we hitch the horse or horses to it, and mount into the seat f, and then, by means of the cross-bar n, draw the bail K back, so as to allow the forward ends of the teeth E to reach the surface of the ground, having fastened them in position by the hook F. As the machine is drawn forward, the teeth E will pass under the hay lying upon the ground, and gather it upon them. When a sufficient quantity for the teeth or machine to carry has thus been gathered, we take hold of the levers H and operate them alternately, and they, in turn, cause the pawls h to act alternately on the ratchet-wheels G, and thus give a rotary motion to the windlass g, having previously, or at the same time, released the arms L and shoved the bail K forward, so as to be in a vertical line with the upright B.

As the windlass turns, the cords k are wound up, the cross-piece I raised, and with it the bail K and front ends of the teeth E. We then drive the machine, thus loaded, to the place where the hay is to be deposited, release the hook F, by pressing down the lever e, when a person standing behind the machine can take hold of the cross-piece c and pull the teeth E back, when the hay will be forced from them.

In order that the rear end of the teeth, or the cross-bar connecting them, may be prevented from dropping down when drawn back, cords, q, may connect it with the upper ends of the uprights C.

Another load may then be gathered and brought in, in like manner, and so on till the whole is gathered.

By the use of our machine, from five to six hundred weight of hay may be gathered at once, rendering it extremely useful for farm-purposes.

Besides being useful, it is simple, and strong in its construction, as well as cheap and durable.

Having thus described our invention,

What we claim, is—

1. A hay-gatherer, consisting of the frame A, mounted on wheels, and having teeth, E, arranged to slide therein longitudinally, and also to have their front ends elevated and lowered by the cords k, windlass g, with ratchets G, and levers H, provided with pawls h, all constructed and arranged to operate substantially as herein described.

2. The combination of the teeth E with the bail K, provided with the arms L, for operating it, when constructed and arranged substantially as described, and for the purpose set forth.

3. The hook F, provided with the lever e, in combination with the teeth E, when constructed and arranged to opeate substantially as herein described, and for the purpose set forth.

A. J. McKEE.
S. D. McKEE.

Witnesses:
ELIAS EVERETT,
LEONARD McKEE.